United States Patent [19]
Williams et al.

[11] Patent Number: 5,427,164
[45] Date of Patent: Jun. 27, 1995

[54] HEAVY DUTY RADIAL TIRE FOR MINIMIZED ROAD DAMAGE

[75] Inventors: Arthur R. Williams, Dorridge; David R. Watkins, Sutton Coldfield, both of Great Britain

[73] Assignee: Sumitomo Rubber Industries Limited, Hyogo, Japan

[21] Appl. No.: 986,738

[22] Filed: Dec. 8, 1992

[30] Foreign Application Priority Data

Dec. 10, 1991 [GB] United Kingdom ................. 9126287

[51] Int. Cl.⁶ ........................... B60C 3/00; B60C 9/18; B60C 11/00
[52] U.S. Cl. ........................ 152/209 R; 152/209 WT; 152/454; 152/526; 152/532; 152/538
[58] Field of Search ................ 152/526, 532, 538, 454, 152/209 WT, 209 R

[56] References Cited

U.S. PATENT DOCUMENTS

| | | | |
|---|---|---|---|
| 1,337,660 | 4/1920 | Killen | 152/454 X |
| 1,842,353 | 1/1932 | Lorentz | 152/526 X |
| 2,498,859 | 2/1950 | Lessig | 152/532 X |
| 3,205,931 | 9/1965 | Keefe, Jr. | 152/538 X |
| 4,286,645 | 9/1981 | Boileau | 152/532 X |
| 4,883,108 | 11/1989 | Takahashi et al. | 152/531 |
| 4,986,326 | 1/1991 | Watkins et al. | 152/532 |
| 5,111,864 | 5/1992 | Nakano et al. | 152/526 X |

FOREIGN PATENT DOCUMENTS

| | | | |
|---|---|---|---|
| 227106 | 4/1963 | Austria | 152/532 |
| 1356041 | 2/1964 | France | 152/526 |
| 1324867 | 7/1987 | U.S.S.R. | 152/532 |

OTHER PUBLICATIONS

*Mechanics of Pneumatic Tires,* ed. Samuel Clark: U.S. Department of Transportation, Aug. 1981, p. 63.

Primary Examiner—Adrienne Johnstone
Attorney, Agent, or Firm—Birch, Stewart, Kolasch & Birch

[57] ABSTRACT

A radial tire for a four wheeled vehicle comprising a reinforced carcass ply extending between two bead regions through sidewall regions to a tread region and a reinforcing breaker disposed in the tread region extending circumferentially around the tire radially outside the carcass ply wherein the tread region is substantially curved in cross-section and has a camber value C/L of between 0.25 to 0.75. The breaker includes at least two plies of reinforcing fabric, a narrower breaker ply which is radially innermost and a wider breaker ply which is radially outermost, and each of the breaker plies except the outermost ply has adjacent to each of its lateral edges a circumferentially extending support strip which extends laterally outward from the edge of the breaker ply to at least the lateral position of the edge of the widest breaker ply.

6 Claims, 5 Drawing Sheets

CONVENTIONAL

HEAVY DUTY RADIAL TIRE FOR MINIMIZED ROAD DAMAGE

FIELD OF THE INVENTION

The present invention relates to a heavy duty radial tire such as may be used for trucks and buses.

DESCRIPTION OF THE BACKGROUND ART

Such tires cause damage to road surfaces which depends on among other factors the structure of the road surface and the mode of operation of the vehicle. The problem has been the subject of various studies and it is now widely accepted that road damage due to the tire increases proportionately to at least the fourth power of the vehicle axle load and in order to minimize damage it is necessary to minimize the contact pressure at the tire/road interface by maximizing the contact area between them, commonly known as the 'tire footprint'.

The world-wide trend in truck tire sales is now towards increased usage of the steel breaker radial tire rather than the older so-called 'cross-ply' construction. The radial tire has been found to be more damaging than the cross-ply tire.

SUMMARY OF THE INVENTION

It is an object of the present invention to provide a radial heavy duty tire such as may be used for trucks or buses which reduces such road damage.

According to one aspect of the present invention a heavy duty radial tire of the type for a truck or a bus comprises a reinforced carcass ply extending between two bead regions through sidewall regions to a tread region and a reinforcing breaker disposed in the tread region extending circumferentially around the tire radially outside the carcass ply. The tread region is substantially curved in cross-section and has a camber value C/L of between 0.25 to 0.75. The breaker includes at least two plies of reinforcing fabric, a narrow breaker ply which is radially innermost and a wider breaker ply which is radially outermost. Each of the breaker ply or plies except the outermost ply has adjacent to each of its lateral edges a circumferentially extending support strip which extends laterally outwards from the edge of the breaker ply to at least the lateral position of the edge of the widest breaker ply. The support strips are free of reinforcing fabric.

By camber value is meant the ratio C/L between the distance C in the radial direction from the center CP of the tread to the edge E of the tread and the distance L in the axial direction from the tread edge E to the tread center CP.

Preferably the radius of curvature of a center part of the tread, which lies within 25% of the tread width from the circumferential centerline of the tire, is in the range of 10% to 30% of the maximum diameter T of the tire, and/or the width of the radially innermost breaker ply is at least 60% of the width of the radially outermost breaker ply.

The edges of the tread may lie laterally outside the bead regions.

Preferably the breaker plies are reinforced with parallel cords laid at an angle of 10 to 30 degrees or more preferably at 25 degrees to the circumferential plane of the tire. The breaker cords may be steel, aromatic polyamide or other such material known in the art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further aspects of the present invention will become apparent from the following description of one embodiment of the invention in conjunction with the following drawings which are given by way of illustration only, and thus are not limitative of the present invention, and in which.

DETAILED DESCRIPTION OF THE PREFERRED EMBODIMENTS

Figure 1:
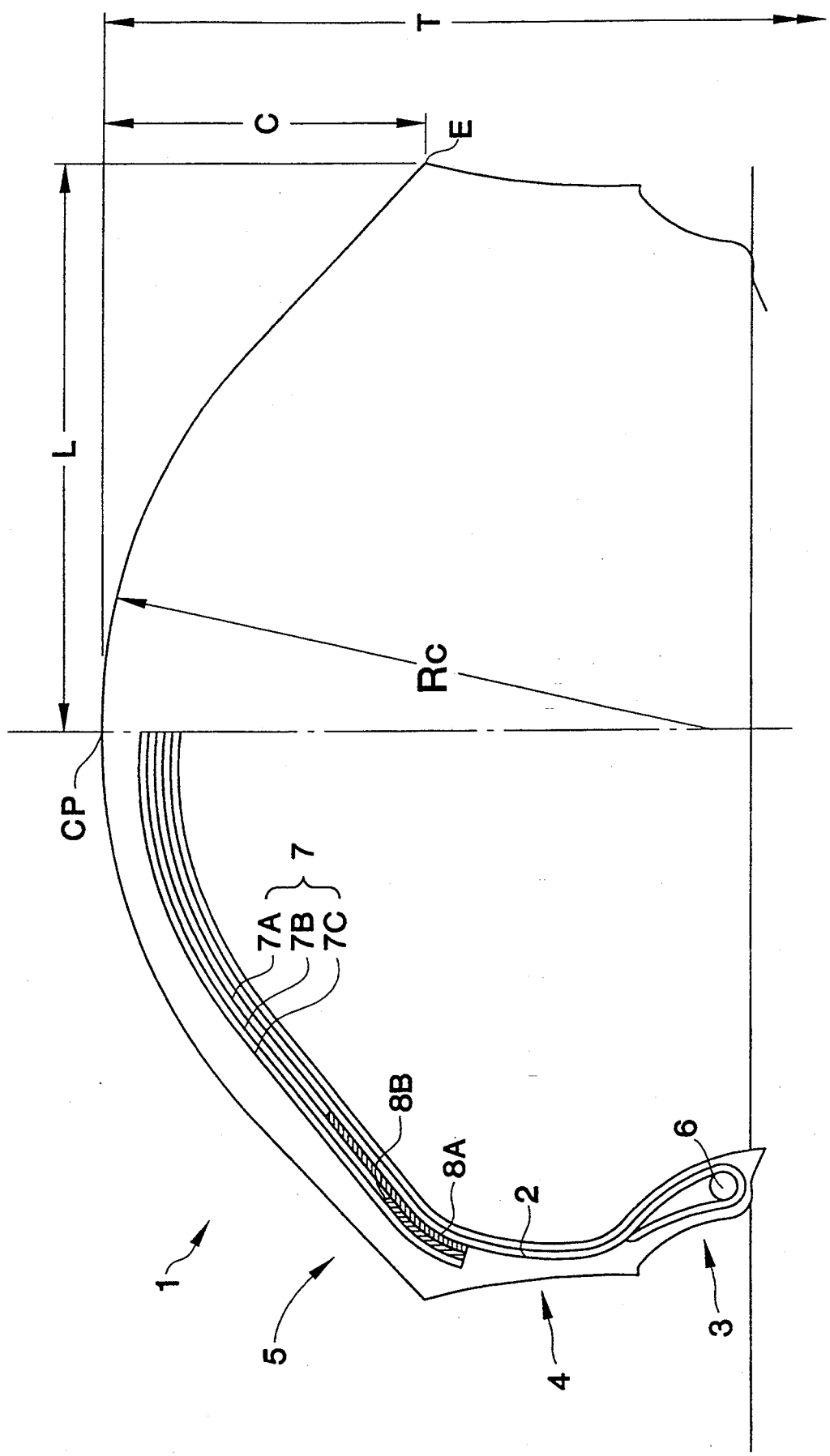
FIG. 1 shows a half cross-section of a tire according to the present invention.

A tire 1 has a reinforcing carcass ply 2 extending radially between two bead regions 3 through sidewall regions 4 to a tread region 5. In each bead region 3 the carcass ply is turned up from the inside to the outside around an inextensible bead core 6. Located in the tread region 5 radially outside of the carcass ply 2 is a reinforcing breaker 7 including three plies of reinforcing fabric 7A, 7B and 7C.

The three breaker plies 7A, 7B and 7C are reinforced with cords of aromatic polyamide and the cords of each ply are laid in opposing senses to cross at an angle of 25 degrees with respect to circumferential centerline of the tread. The radially innermost ply 7A is the narrowest whilst the outermost ply 7C is the widest having a width similar to that of the tread. The width of each of the breaker plies measured parallel to the carcass ply 2 is 135 mm, 170 mm and 205 mm respectively.

Adjacent to each of the lateral edges of the inner breaker plies 7A and 7B is positioned a circumferentially extending rubber support strip 8A, 8B having a thickness in the radial direction similar to that of the breaker ply to which it is in edge to edge abutment. These strips 8A and 8B extend from the edge of the respective breaker ply 7A, 7B to in this case a position adjacent to the edge of the outermost breaker 7C but they may extend further towards or into the bead region 3 if desired. These rubber support strips 8A, 8B prevent the lateral portions of the breaker immediately radially outside from moving radially inwardly towards the carcass ply 2 and thus the line of the breaker is maintained in a similar shape to the profile of the tread.

Figure 3:
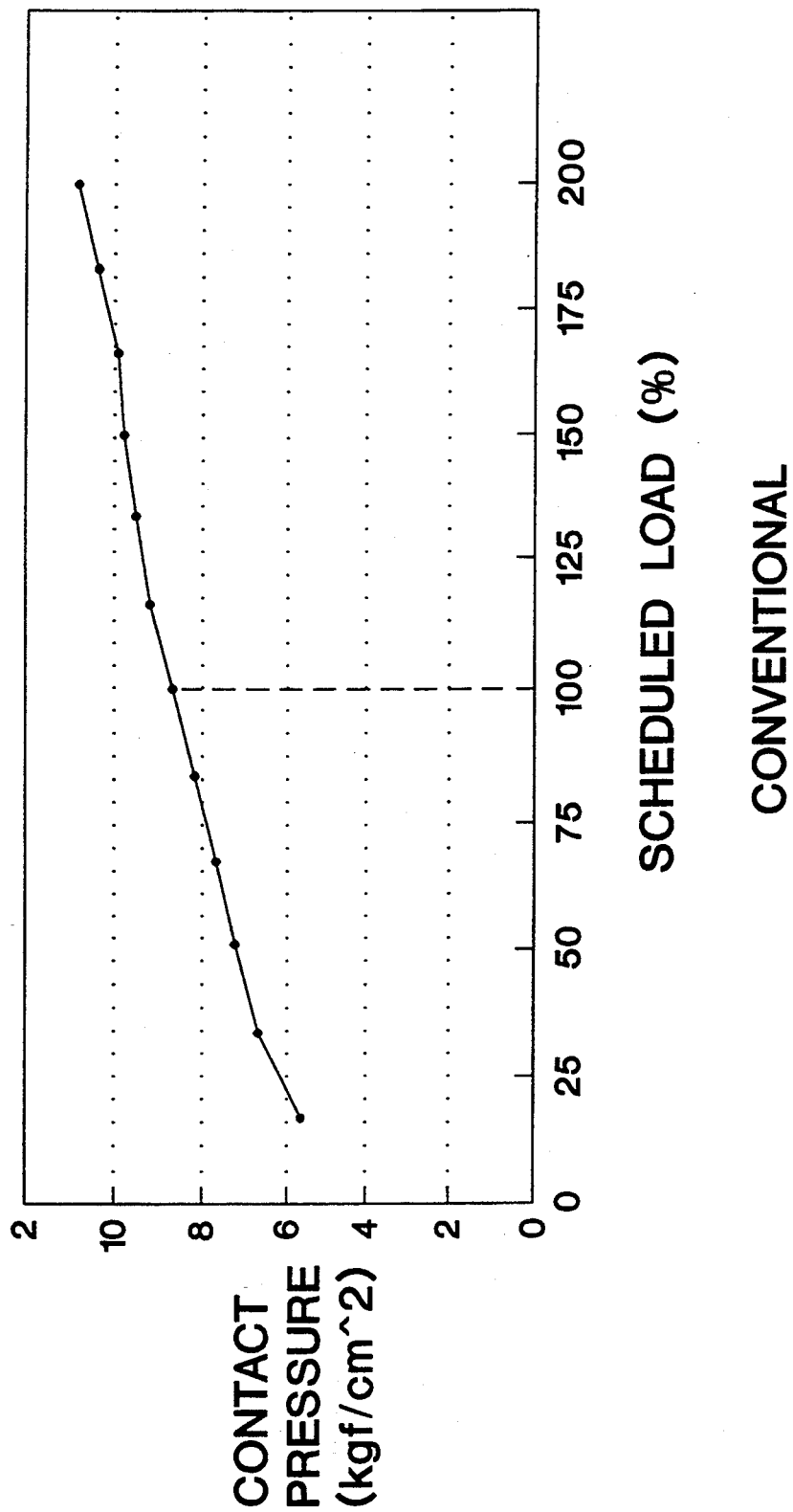
FIG. 3 is a graph showing the variation of contact pressure with load for the conventional truck tire of FIG. 2.

Details of the geometry of the tire are shown in the right hand side of FIG. 3. The tire overall diameter T is 640 mm. The camber value C/L of the tire is 0.56 and the radius of curvature Rc of the tread in the central region is 100 mm.

Figure 2:
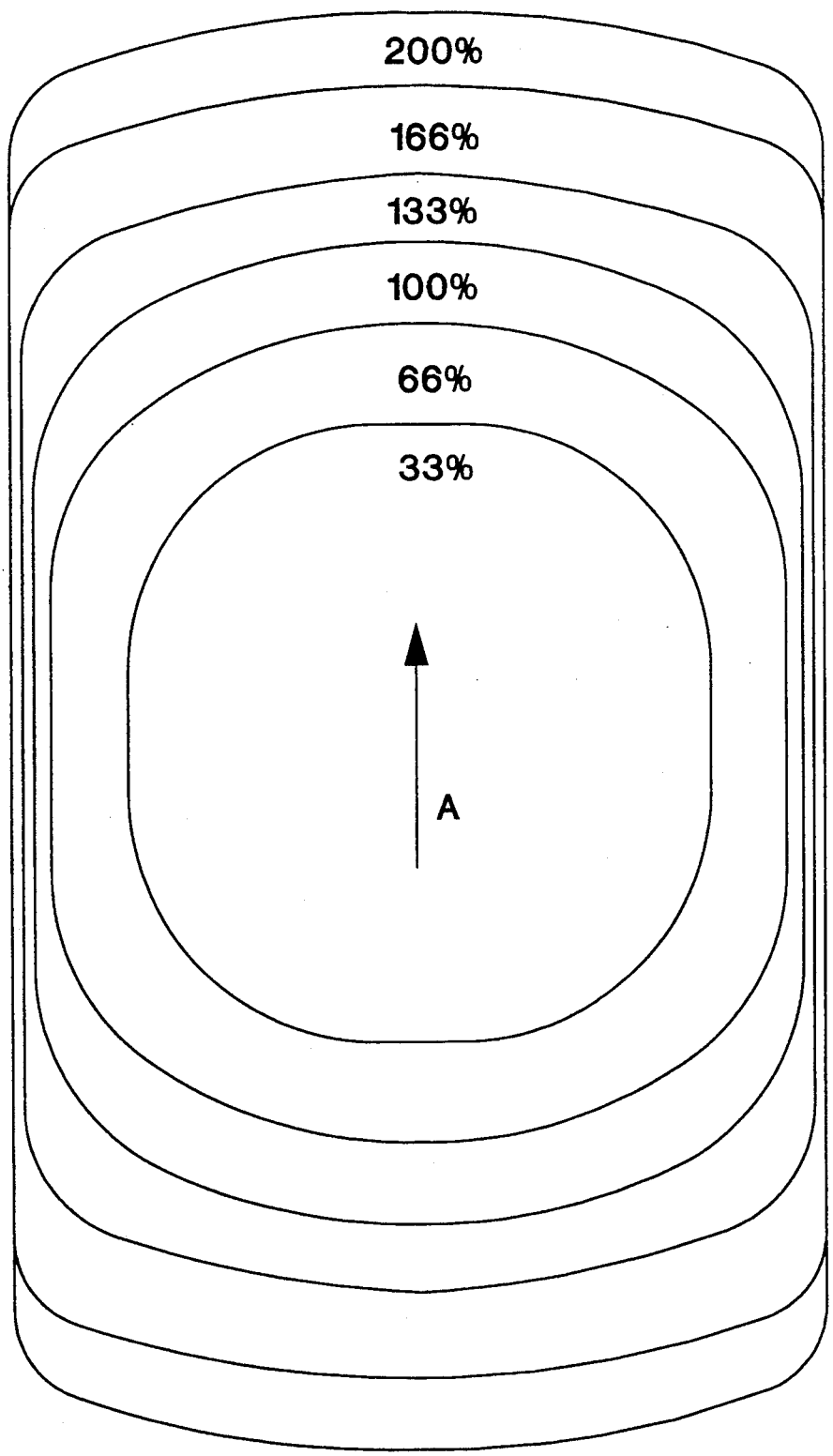
FIG. 2 is a schematic diagram showing the relative shapes and sizes of the contact area of a conventional front axle truck tire over a range of loads.

Illustrated in FIG. 2 is the variation of the contact area of a conventional 11R22.5 size front axle radial truck tire at the scheduled inflation pressure of 8 bar under loads ranging from 33% to 200% of the scheduled load. The arrow A indicates the contact area length in the circumferential direction of the tire. This shows that the contact area increases with load. However the corresponding variation in the average contact pressure, shown in FIGS. 3, shows clearly that the increase in contact area is not sufficient to maintain a constant contact pressure. Accordingly the contact pressure and hence the road damaging capability of the conventional radial tire construction increase with increasing tire load. Thus, it can be deduced from FIG. 2 that, for example, operating a typical 11R22.5 radial front axle truck tire at only 20% overload leads to a 30% increase in potential damage.

Figure 4:
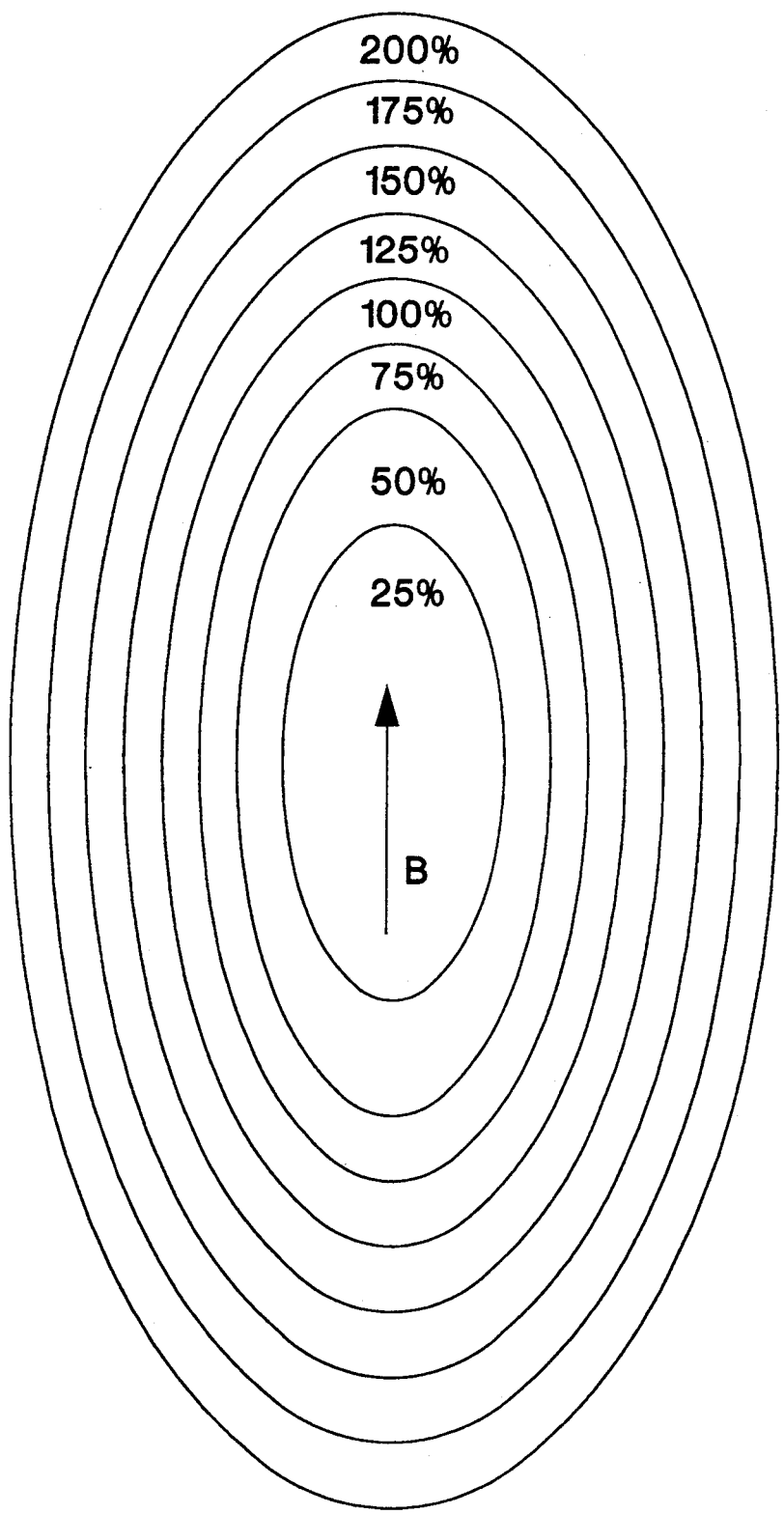
FIG. 4 is a schematic diagram showing the relative shapes and sizes of the contact area of the tire of the present invention shown in FIG. 1 over a range of loads.

In contrast, FIG. 4 shows the relative shapes and sizes of the contact area of the tire of the present invention shown in FIG. 1 over a range of loads. The arrow B indicates the contact area length in the tire circumferential direction. In comparison to the corresponding shapes of the conventional truck tire, shown in FIG. 2, the tire of the present invention displays a contact area shape in which the proportions of length and width are retained over a wide range of loads.

Figure 5:
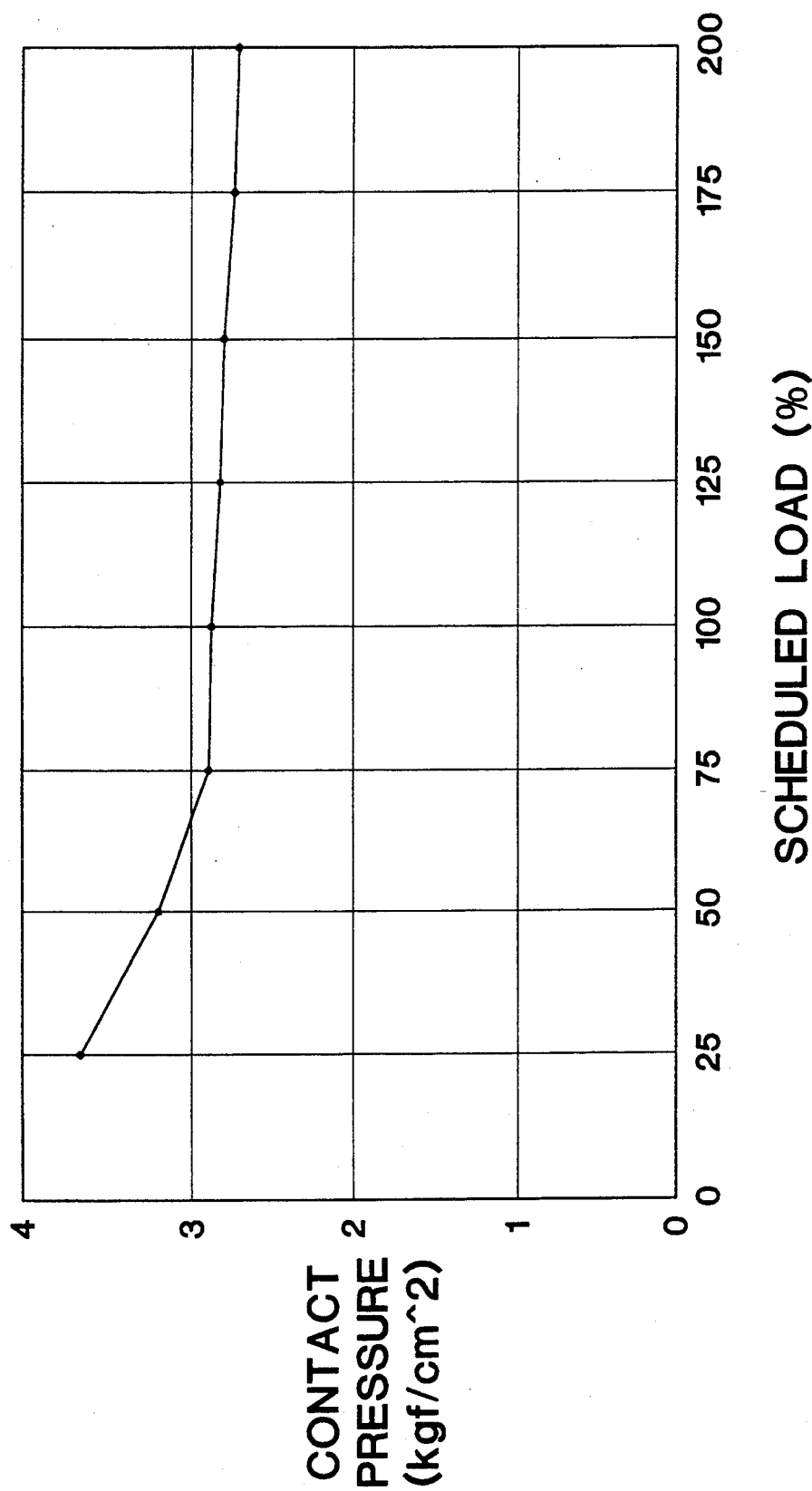
FIG. 5 is a graph showing the variation of contact pressure with load for the tire of the invention shown in FIG. 1.

Accordingly, the variation of contact area with load in the case of the tire of the present invention is such that the average contact pressure does not significantly increase with load. In fact FIG. 5, in which the contact pressure for the tire of FIG. 1 is plotted against load, shows that contact pressure is actually decreased at higher loads and thus the potential damage to the road surface by the tire is significantly reduced over prior art tires.

Whilst the breaker 7 has been described as comprising three plies of width 135, 170 and 205 mm, the invention can also be used with a breaker comprising other number of plies, for example two, and also to breaker plies having greater widths suitable for tires for high load carrying application.

Whilst the invention has been illustrated by the description of a tire of 640 mm overall diameter it is also applicable to tires of other diameters.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A truck or bus radial tire comprising a reinforced carcass ply extending between two bead regions through sidewall regions to a tread region and a reinforcing breaker disposed in the tread region extending circumferentially around the tire radially outside the carcass ply wherein the tread region is substantially curved in cross-section and has a camber value C/L of between 0.25 to 0.75, the breaker includes at least two plies of reinforcing fabric, a narrower breaker ply which is radially innermost and a wider breaker ply which is radially outermost, and each of the breaker plies except the outermost ply has adjacent to each of its lateral edges a circumferentially extending rubber support strip which extends laterally outward from the edge of the breaker ply to at least the lateral position of the edge of the widest breaker ply, the radius of curvature Rc of the center part of the tread lying within 25% of the tread width from the circumferential centerline of the tire is in the range of 10% to 30% of the maximum diameter T of the tire.

2. The truck or bus radial tire according to claim 1, wherein the width of the radially innermost breaker ply is at least 60% of the width of the radially outermost breaker ply.

3. The truck or bus radial tire according to claim 1 wherein the breaker plies are reinforced with parallel cords laid at an angle of 10 to 30 degrees to the circumferential plane of the tire.

4. The truck or bus radial tire according to claim 1, wherein the breaker plies comprise parallel cords laid at an angle of 25 degrees to the circumferential plane of the tire.

5. The truck or bus radial tire according to claim 1 wherein the breaker plies are reinforced with cords of an aromatic polyamide.

6. The truck or bus radial tire according to claim 1 wherein the breaker plies are reinforced with steel cords.

* * * * *